United States Patent [19]

Mott

[11] 4,186,100
[45] Jan. 29, 1980

[54] INERTIAL FILTER OF THE POROUS METAL TYPE

[76] Inventor: Lambert H. Mott, Farmington Industrial Park, Farmington, Conn. 06032

[21] Appl. No.: 896,222

[22] Filed: Apr. 17, 1978

Related U.S. Application Data

[63] Continuation-in-part of Ser. No. 749,874, Dec. 13, 1976, Pat. No. 4,088,576.

[51] Int. Cl.² ............................................. B01D 39/20
[52] U.S. Cl. .............................. 210/496; 210/497 R; 210/506; 210/510
[58] Field of Search ............... 210/510, 489, 490, 496, 210/500 M, 497 R, 503, 504, 506

[56] References Cited

U.S. PATENT DOCUMENTS

| | | | |
|---|---|---|---|
| 2,979,400 | 11/1961 | Mouwen | 210/510 |
| 3,241,681 | 3/1966 | Pall | 210/510 |
| 3,728,061 | 4/1973 | Mott | 210/496 |
| 3,796,314 | 3/1974 | Kolek | 210/496 |
| 3,878,104 | 4/1975 | Guerrero | 210/510 |

*Primary Examiner*—Charles N. Hart
*Assistant Examiner*—Ivars Cintins
*Attorney, Agent, or Firm*—Prutzman, Kalb, Chilton & Alix

[57] ABSTRACT

A porous filter is formed of sintered metal particles and is characterized by having sintered metal particles of relatively large size throughout and a thin subsurface area adjacent the upstream surface containing sintered metal particles of relatively small size, thus providing a thin area of relatively small pore size adjacent the upstream surface while the remaining major portion of the filter has a relatively large pore size. The filter is particularly useful as an inertial filter and as a support for reverse osmosis membranes.

9 Claims, 7 Drawing Figures

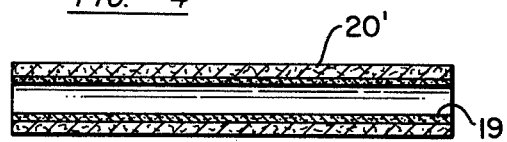
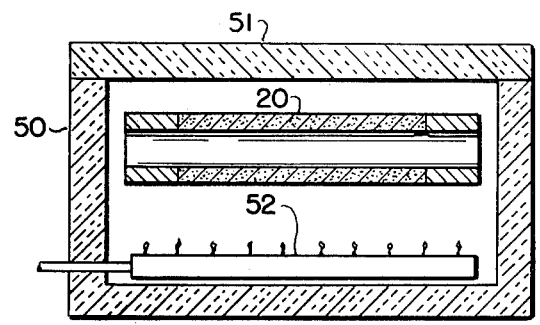
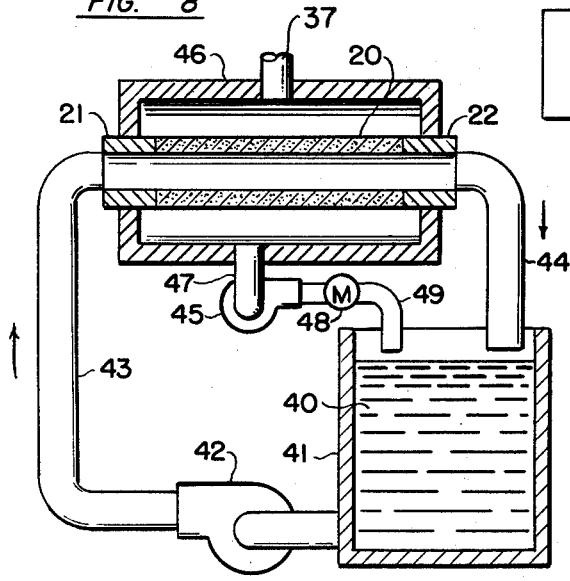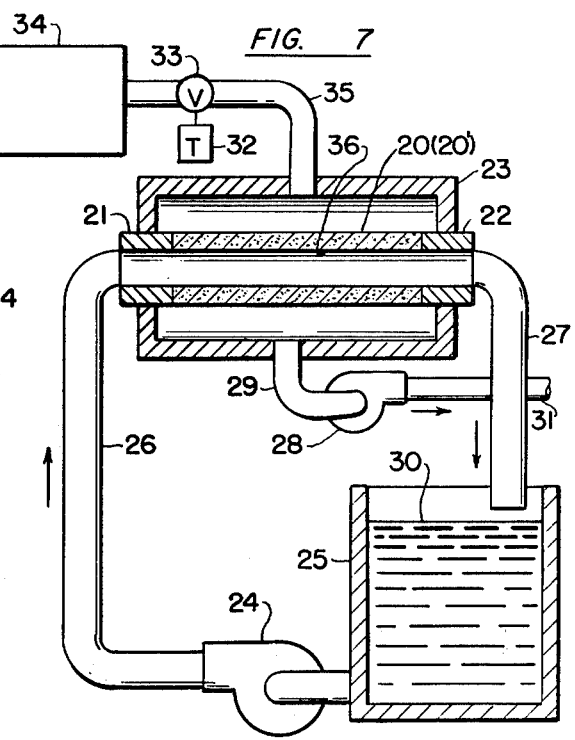

INERTIAL FILTER OF THE POROUS METAL TYPE

RELATED APPLICATION

This application is a continuation-in-part of my co-pending application, Ser. No. 749,874, filed Dec. 13, 1976, and entitled "Method of Manufacture of Tubular Inertial Filter", now U.S. Pat. No. 4,008,576.

BACKGROUND AND SUMMARY OF THE INVENTION

The present invention relates generally to filters, and more particularly, to industrial filters of the porous metal type. The filters of the present invention are particularly adapted for use as inertial filters and also, when provided with a semi-permeable membrane on the upstream surface, for use in the separation of liquids by reverse osmosis.

Porous metal filters are conventionally made by forming metal particles or powder into the desired filter shape using a volatile binder and/or pressure to render it form sustaining and then the metal particles are converted into a porous aggregate by heating or sintering at a temperature approaching the melting point of the particular metal, preferably in a controlled atmosphere. Conventional porous metal filters made by conventional techniques are frequently referred to as isopermeable, in that they have a generally uniform pore structure throughout. Such filters are particularly useful for filtering foreign particles from a fluid, the particulate material being entrained in depth in the filter pores as the fluid travels therethrough. When the pores become clogged, the filter is no longer usable and has to be subjected to a cleaning operation in order to render it again effective. Modification of such filters which will increase the period of operation of the filter before clogging is disclosed and claimed in my prior U.S. Pat. No. 3,728,061 and comprises forming the filter in layers of approximately equal thickness with the upstream layer having a larger pore size and providing a lesser degree of filtration and the downstream layer having a smaller pore size and a higher degree of filtration.

Porous metal filters made in accordance with the prior art have been used as inertial filters, sometimes referred to as concentrators, but have not been entirely satisfactory for this purpose. In the use of inertial filters, the fluid to be filtered is pumped parallel to the upstream surface of the filter and as it passes along the surface, a differential pressure across the wall causes a portion of the fluid to flow therethrough as clear filtrate. The problem with porous metal filters made in accordance with the prior art when used as inertial filters is that when formed to provide the required high degree of filtration and necessary mechanical strength, the filter creates excessive back pressure interfering with the removal of filtrate and more particularly, the filter is resistant to cleaning by blowback pulses which is necessary to keep the filter in continuous operation.

Accordingly, it is an object of my invention to provide an inertial filter providing a high degree of filtration and required mechanical strength while at the same time having sufficient permeability so that it will have an acceptable low back pressure, and being so constructed that blowback cleaning of the filter is rendered more effective.

This and related objects, which will be in part obvious and in part pointed out in more detail hereinafter, are accomplished in accordance with the present invention by forming the filter wall with a matrix of sintered metal particles of relatively large size and having relatively large interconnecting pores and a very thin subsurface portion adjacent the upstream surface with sintered metal particles of relatively small size producing interconnecting small pores just below the upstream surface.

BRIEF DESCRIPTION OF THE DRAWING

FIG. 4 is a cross-sectional view of a tubular porous metal filter showing a modified form of the invention;

FIG. 5 is a longitudinal section through a porous metal filter tube and a surrounding jacket and a side view, with a tank shown in section, of apparatus treating the filter tube according to a step in the method of this invention to provide the filter of this invention;

FIG. 6 is a section through a sintering oven and a filter tube therein showing a further step in the method of this invention; and FIG. 7 is a longitudinal section through a filter tube and a surrounding jacket and a side view, with a tank shown in section, of apparatus using the filter of this invention.

DESCRIPTION OF THE PREFERRED EMBODIMENT

Figure 2:
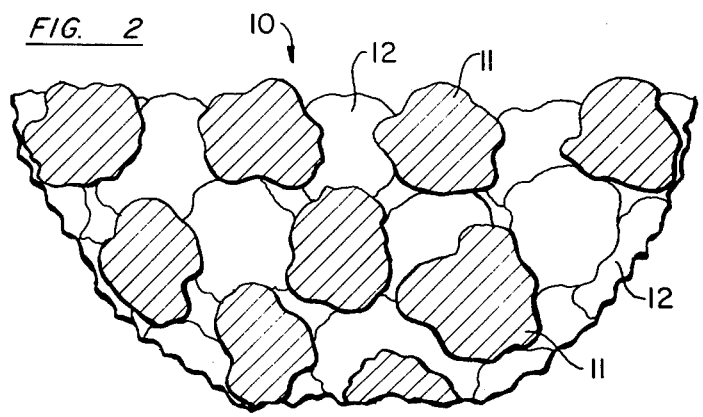
FIG. 2 is a view similar to that of FIG. 1 showing a fragment of a conventional porous metal filter prior to modification in accordance with this invention.

As shown in FIG. 2, a porous metal filter 10 has metal particles 11 compacted to a desired degree and sintered to bond the particles 11 together in the well known manner. Interconnecting pores 12 provide a fluid path through the wall of the filter 10.

FIG. 7 shows a porous metal tubular filter 20 with ends 21 and 22 welded thereto and fixed in jacket 23. A pump 24 draws fluid 30 from tank 25 and passes it through pipe 26 and tubular filter 20 from which pipe 27 returns fluid 30 to the tank 25. A pump 28 withdraws a filtered effluent through pipe 29 and discharges the effluent from the system through pipe 31. The apparatus may be used to concentrate and recover usable product from dilute streams. For example, if fluid 30 is a slurry of particulate matter such as lead oxide in the production of paint pigment, this apparatus will concentrate it. As is known, the apparatus is also useful for concentrating waste materials or for recovering and recycling solvents or clarifying liquids.

As the apparatus is operated, the largest proportion of the fluid 30 will pass axially through the filter 20 to pipe 27 and tank 25 for eventual recycling, while a small proportion, for example about 10 percent, of filtered effluent will be removed through pipe 29. As the operation continues, the filter pores 12 will become clogged and the rate of effluent withdrawal will drop. A timer 32 can periodically open a valve 33 to allow a short pulse of effluent under pressure in tank 34 to enter jacket 23 through pipe 35 and blow back through tubular filter 20 to dislodge caked material clogging the pores 12 of the upstream or inner surface 36 of filter 20. Due to the tortuous path through which the effluent must pass, the short blowback pluse will dislodge only about 90 to 98 percent of the particles lodged in the filter, and the remaining 2 to 10 percent will be concentrated adjacent the inner surface due to the compacting action of the blowback pulse. After about 10 to 20 cycles, the compacted particulate material will form a stable blocking layer.

Referring now to FIG. 5, a preferred method of preparing a filter according to this invention first involves providing a filter tube 20 of a lower degree of filtration that has larger pores 12 as shown in FIG. 2. Such a filter tube 20 may be readily prepared in accordance with the method disclosed in my prior U.S. Pat. No. 2,792,302 or by using the method disclosed in my prior U.S. Pat. Nos. 3,567,437 and 3,632,243, for example. In accordance with the invention, the metal particles 11 used in preparing the tube 20 will preferably have a mean average size of around 25 to 30 microns. In general, particles in a size range of 0.5 to 44 microns will be suitable for most purposes. The metal selected is a matter of choice, but generally will be a corrosion resistant metal such as for example the various grades of stainless steels, or nickel and nickel chromium alloys such as sold under the trademarks Monel and Inconel. Preferably, the filter 10 will provide a matrix having a porosity in the range of about 10 to 50 percent. A typical filter 10 would have a wall thickness in the range of about 0.01 to 0.5 inches, and an inner diameter in the range of about 1/16 to ⅜ inch. As a general rule, depending upon the pump pressure and capacity available, a longer tube will normally be formed with a larger inner diameter and a shorter tube with a smaller inner diameter.

A slurry 40 of smaller metal particles in water is prepared and placed in tank 41. Pump 42 circulates the slurry through pipe 43, filter 20, and pipe 44 back to tank 41. Pump 45 draws water as an effluent from jacket 46 through pipe 47 and passes the effluent through a meter 48 and pipe 49 back to tank 41. Because of the inertia effect, most of the metal particles of slurry 40 and particularly the larger ones will pass longitudinally through the filter 20. However, some of the particles will be carried by the effluent into the pores 12 and will deposit there. When flow meter 48 indicates that metal particles have been deposited in the pores 12 reducing the flow rate of effluent through the filter 20, a short pulse of effluent under pressure is introduced through pipe 37 to compact the metal particles at the inner surface of the tube. When a stable layer has been formed, filter 20 is removed from the apparatus shown in FIG. 5 and placed in the sintering oven 50 shown in FIG. 6. Oven 50 had a lid 51 and contains a heating element 52. Water is dried from the filter tube and its temperature is raised to sinter the metal particles embedded in its pores in place. Because of the shrinkage which usually takes place during the sintering operation, it usually is advantageous to repeat the deposition step just described and again sinter. It also is possible in the repeated deposition step, to use a slurry having particles which are smaller than those present in the slurry used in the first deposition step, thus increasing the resulting degree of filtration of the finished product.

Figure 1:
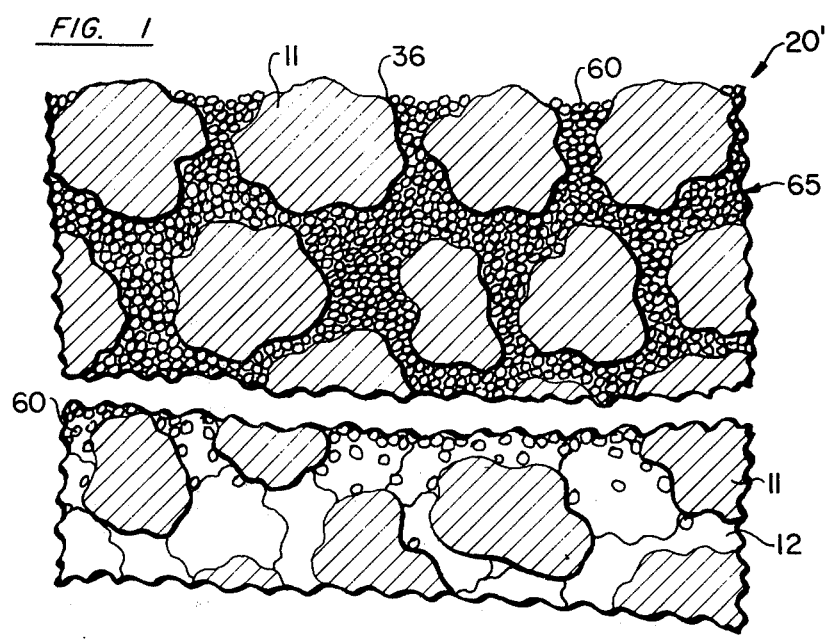
FIG. 1 is a greatly enlarged pictorial representation of a microscopic section taken through a fragment of the upstream surface of a porous metal filter made according to this invention.

As illustrated in FIG. 1, the smaller deposited particles 60 are concentrated adjacent the upstream surface 36 and penetrate the filter wall only a very slight distance. In general, the penetration should not exceed 0.015 inches and may be as little as 0.001 inches. The preferred range of penetration is 0.003 to 0.005 inches. The particles 60 do not deposit on the surface 36 because of the wiping effect caused by the flow of the slurry parallel to surface 36.

The particles 60 used in preparing the slurry 40 may be composed of the same metal as the metal particles 11 used in forming the tube 20 or may be composed of a different metal. As a specific example, a slurry 40 prepared with nickel particles has been found to be very effective with a stainless steel tube 20. The size of the particles 60 is always considerably less than the size of the metal particles 11 used in preparing the tube 20 and is selected in accordance with the degree of filtration it is desired to attain. However, they cannot be so small that they will not deposit out in the subsurface immediate to the upstream side of the filter. In general, it is preferred that the deposited particles 60 have an average size within the range of 0.02 to 0.5 microns and are of 1-2 order of magnitude finer than the particles 11. This will produce an upstream surface having a pore size of about 15 microns down to about 1 or 2 microns. Not all of the particles 60 in the slurry need to be of this small size provided there are sufficient fines present to produce the desired deposition.

As illustrated in FIG. 4, a modification of the tube 20 which may be used to increase the permeability of the filter while still attaining the same high degree of filtration consists in forming the tube 20, which may have a larger pore size because particles 11 are used, with a thin inner liner 19 of smaller pore size for receiving the deposit of the particles 11. The thin inner liner 19 need not be much thicker than that required to contain the deposited particles 60. Because the liner 19 will retain the particles 60, the remainder of the tube can be formed with a greatly enlarged pore size using particles in the 10-500 micron range.

As shown in FIG. 1, the nickel particles 60 only penetrate the upstream surface 36 a very slight distance. When the particles 60 are sintered in place, the filter 20′ of this invention is provided. If filter 20′ is used in the apparatus of FIG. 7, it will function for a very long period of time without clogging as cloggable pores 12 are filled with a porous layer 65 of fine sintered particles. If it eventually becomes clogged, a blowback pulse from tank 34 will more easily and completely clear it because the pressure of the pulse easily passes through the large pores 12 to reach the fine thin layer 65 of sintered particles 60. The filter 20′ can't be clogged by fines as any particle passing the layer 65 will easily pass through the larger pores 12 to exit filter 20′. Further, upstream filter surface 36 has its pores 12 filled with sintered fines 60 so that irregularities are reduced and surface caking is rendered less likely. Thus the result of this invention is to provide a very thin filtering zone adjacent the upstream surface providing the desired high filtration rate and at the same time providing a filter having good porosity and mechanical strength. The filters made in accordance with the present invention can be made to withstand pressures as high as 3000 psi, without fracturing or rupturing. In general, the power required when using the filter of the present invention in comparison with an isopermeable filter having the same degree of filtration is reduced by one-third to one-half.

As one example of this invention, stainless steel isopermeable tubes 20 were made with 0.953 cm. O.D. and 0.635 cm. I.D. having a bubble point in isopropyl alcohol of 7.6 to 8.9 cm. of mercury. Used as inertial filters 20 with the apparatus shown in FIG. 7, these tubes were able to function as effective 0.5 micron filters with a flow rate through the tube 20 of 30.48 cc. per sq. cm. of upstream filter surface per minute. With different slurries being filtered, effluent flow dropped with time. With one carbon particle slurry in water, effluent flow dropped from 11.36 liters per 0.0929 sq. m. of upstream filter surface per minute to 0.189 liters per 0.0929 sq. m. per minute with a progressively less effective blowback pulse series applied every twenty minutes.

Figure 3:
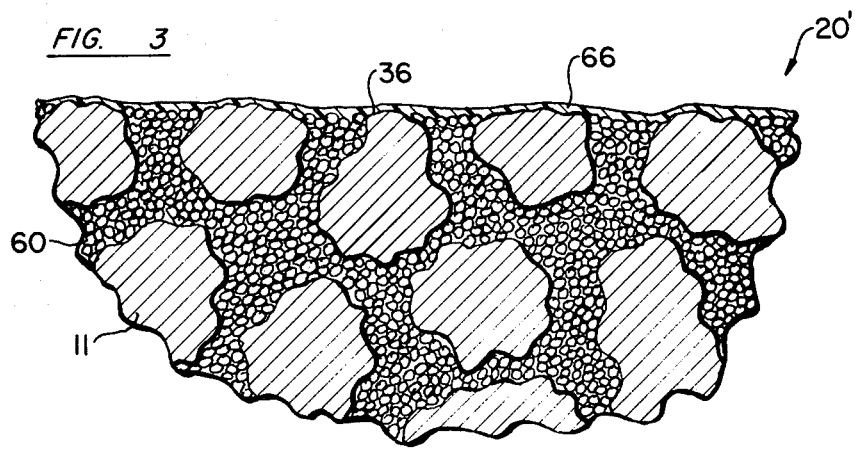
FIG. 3 is a view similar to FIG. 2 showing the use of the porous metal filter as a support for a reverse osmosis membrane.

An identical tube 20 was placed in the apparatus shown in FIG. 3 with a 1 percent by weight water slurry of nickel having 0.5 micron particles in tank 41. The apparatus was operated until the effluent flow rate dropped from almost 11 liters per 0.0929 per minute to 0.189 liters per 0.0929 sq. m. The tube 20 was then removed and sintered to bond the nickel particles in place and the resulting tubular filter 20' was placed in service in the apparatus shown in FIG. 7. Its initial effluent flow rate was about 3.5 liters per 0.0929 sq. m. per minute in a carbon slurry and it remained unplugged before requiring blowback much longer than the conventional tube 20. Blowback was much more effective and filter tube life was extended over ten times.

As previously mentioned, the filter 20' may also be used advantageously as a support for reverse osmosis membranes. This is illustrated in FIG. 3, where the upstream surface 36 of the filter 20 is covered with a thin semi-permeable membrane in the form of a thin coating 66 of a plastic such as cellulose acetate, nylon, methacrylates, regenerated cellulose, or polyethylene for example. The plastic in liquid state or in solution is flowed onto the surface 36 and permitted to set in as thin a layer as possible, preferably of the order of 0.3 microns. When an aqueous solution is pumped into a tube so constructed under high pressure such as 600–1500 psi, solvent water will escape through the plastic layer 66 and filter 20' while the solute will remain behind, this being known as reverse osmosis. The advantage of using the filter 20' is that it provides a relatively smooth supporting surface 36 having small pores thus preventing rupture of the membrane while providing the necessary mechanical strength but at the same time is relatively porous thus avoiding excessive back pressure. Reverse osmosis is useful for removing purified water from contaminated water such as brackish water or sea water, and also for concentrating sugar solutions, fruit juices, and coffee by removing water therefrom.

Although the description of the preferred embodiment has been limited to a tubular filter of circular cross-section, it will be appreciated that the application of the invention is not limited to this particular shape, as in some installations it may be desirable to use other forms of filters. This and other various modifications, adaptations and variations of the foregoing specific disclosure as will be apparent to persons skilled in the art can be made without departing from the teachings of the present invention.

I claim:

1. An inertial type filter element comprising a porous wall composed of sintered metal particles in the size range of 0.5 to 44 microns and having a subsurface section not exceeding about 0.015 inches in thickness adjacent its upstream surface having a smaller pore size formed by finer metal particles in the size range of 0.02 to 0.5 microns which are deposited and sintered therein.

2. A filter element as defined in claim 1 wherein the filter element wall is in the form of a cylindrical tube and the upstream surface is its inner surface.

3. A filter element as defined in claim 2 wherein the cylindrical tube is formed as an outer tube having an inner lining and wherein the inner lining has a smaller pore size than the outer tube.

4. A filter element as defined in claim 2 wherein the cylindrical tube has an inner diameter within the range of 1/16 to ⅜ inch.

5. A filter element as defined in claim 2 wherein the inner surface is covered with a semi-permeable membrane.

6. A filter element as defined in claim 5 wherein the semi-permeable membrane is a coating of plastic.

7. A filter element as defined in claim 1 wherein all of the metal particles are formed of corrosion resistant metal.

8. A filter element as defined in claim 1 wherein the thickness of the porous wall is in the range of 0.01 to 0.5 inches.

9. A filter element as defined in claim 8 wherein the filter element is in the form of a cylindrical tube and the upstream surface is its inner surface.

* * * * *